United States Patent [19]

Obermaier

[11] 3,968,395

[45] July 6, 1976

[54] TWO FILAMENT ELECTRIC BULB TRAFFIC LIGHT

[75] Inventor: Anton Obermaier, Munich, Germany

[73] Assignee: Siemens Aktiengesellschaft, Berlin & Munich, Germany

[22] Filed: Mar. 28, 1975

[21] Appl. No.: 563,060

Related U.S. Application Data

[63] Continuation of Ser. No. 397,882, Sept. 17, 1973, abandoned.

[30] Foreign Application Priority Data

Sept. 25, 1972 Germany .......................... 2246914

[52] U.S. Cl. .................................. 315/65; 315/129; 313/222; 340/46; 340/251

[51] Int. Cl.² ......................... H01J 7/44; B60Q 9/00

[58] Field of Search ................. 315/64, 65, 83, 129, 315/130, 131; 340/46, 78, 251; 313/222

[56] References Cited

UNITED STATES PATENTS

| | | | |
|---|---|---|---|
| 2,166,721 | 7/1939 | Jeffers | 340/46 |
| 3,148,016 | 9/1964 | Fisher | 315/65 |
| 3,221,210 | 11/1965 | Mullings | 315/130 |
| 3,309,563 | 3/1967 | McKienzie | 315/88 |
| 3,609,681 | 9/1971 | Saul | 315/83 |
| 3,626,236 | 12/1971 | Robinson et al. | 313/222 |
| 3,631,441 | 12/1971 | Murphy | 340/251 |
| 3,646,386 | 2/1972 | Rijnders | 313/222 |
| 3,736,452 | 5/1973 | Rijnders | 313/222 |

FOREIGN PATENTS OR APPLICATIONS

| | | | |
|---|---|---|---|
| 1,229,694 | 4/1971 | United Kingdom | 313/222 |

OTHER PUBLICATIONS

Proceedings IEE, vol. 117, No. 10, Oct. 1970, pp. 1953–1959 (Note Topic No. 5 and FIG. 8).

*Primary Examiner*—Stanley D. Miller, Jr.
*Attorney, Agent, or Firm*—Hill, Gross, Simpson, Van Santen, Steadman, Chiara & Simpson

[57] ABSTRACT

A two filament light bulb in a traffic signal generator has a main filament and an auxiliary filament. The light bulb is a two filament halogen light bulb and the traffic light controller includes apparatus for periodically and alternately exchanging the role of main and auxiliary for the two filaments.

3 Claims, 1 Drawing Figure

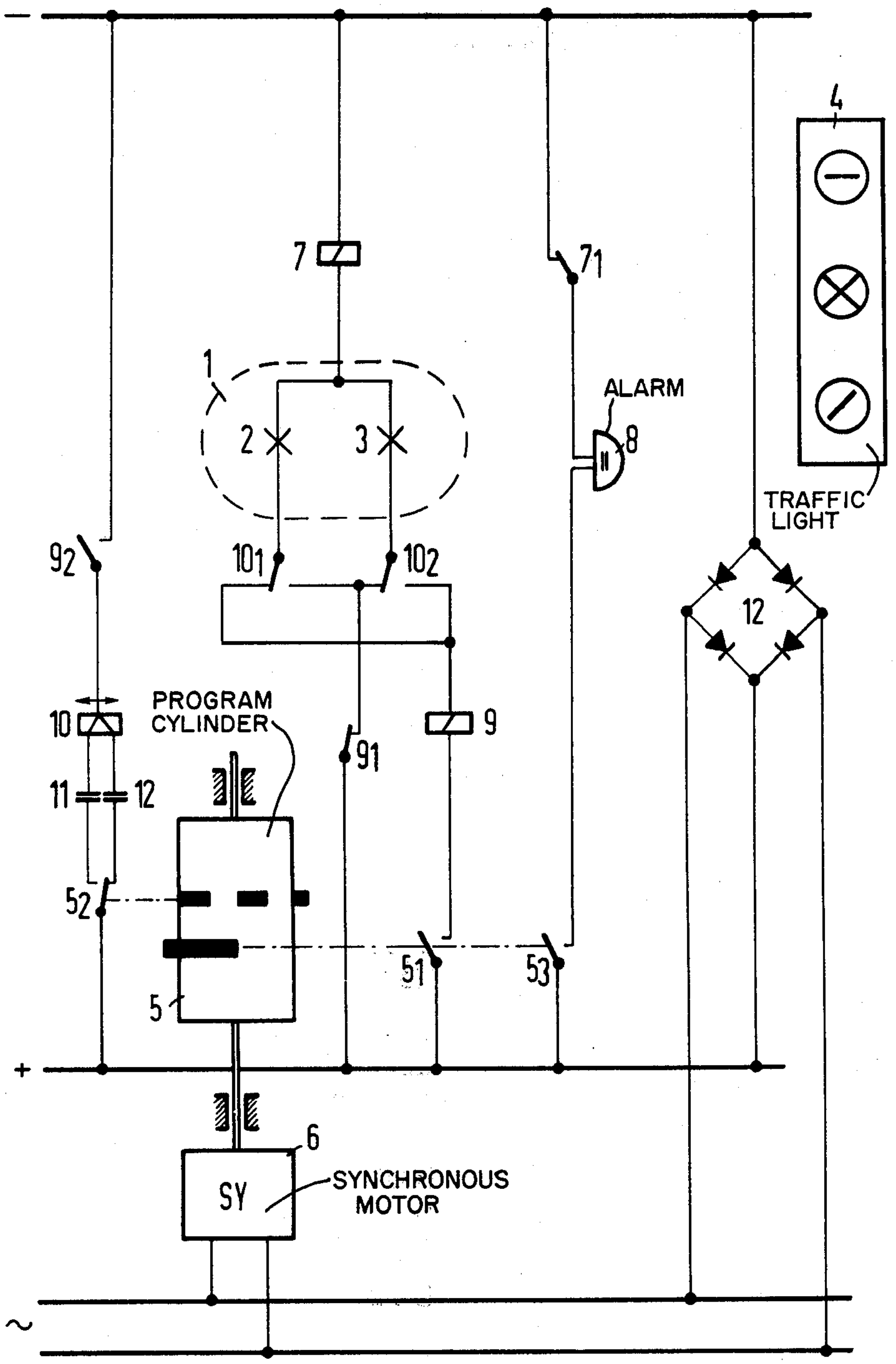
4
7
71
1
ALARM
8
2
3
TRAFFIC LIGHT
92
101
102
12
PROGRAM CYLINDER
10
9
91
11
12
52
51
53
5
+
6
SY
SYNCHRONOUS MOTOR
~

TWO FILAMENT ELECTRIC BULB TRAFFIC LIGHT

This is a continuation of application Ser. No. 397,882, filed Sept. 27, 1973.

BACKGROUND OF THE INVENTION

1. Field of the Invention

This invention relates to a two filament electric bulb for safe illumination of traffic light signal generators, and more particularly to apparatus for periodically and alternately energizing each of the filaments as a main filament and an auxiliary filament.

2. Description of the Prior Art

It is well recognized in the prior art that under no circumstances should a stop or red light be allowed to fail in traffic light signal generators, since such failure could endanger life and property. It is therefore known to supervise such stop signals with respect to their required operating conditions and to switch off signal lights in the event of failure. Since a traffic signal arrangement would be interrupted, at least partially, in its operation, it has been heretofore a practice to provide reserves in the signal light generators for the stop signals in such a way that either two electric bulbs, or at least electric bulbs with two filaments, are provided.

In the case of two electric bulbs, the stop signal is usually operated with both bulbs simultaneously activated.

Contrary to the above approach, two filament lights are designed in such a way that only one of the two filaments is allowed to be activated at one time. In the case of a failure of the "main" filament, the operation is transferred to the respective auxiliary filament.

The utilization of a traffic light comprising several electric bulbs is not satisfactory, since the signal generator must be larger, and since two illumination fields must be provided for the same signal. In comparison therewith, electric bulbs having two filaments offer the possibility of a space-saving installation, since for the two filaments, which are located close to each other, the same focal point may be assumed. With such a construction, operation takes place according to the principle of operating readiness or redundance. Accordingly, a "main" filament is used regularly and supervised, and in case of failure of the main filament, the "auxiliary" filament is switched on automatically and an alarm signal is activated at the same time.

Recently, halogen electric bulbs have been used as light sources, since halogen bulbs have a substantially higher light yield and a longer life expectancy than normal electric bulbs. In addition, halogen bulbs are free of blackening which otherwise causes a gradual decrease of the light yield. Unfortunately, heretofore such halogen electric bulbs could not be used as two filament lights with one "main" filament and one "auxiliary" filament for traffic light signal generators. Because of the tungsten-halogen cyclical process in these lamps, the relatively cold tungsten parts in the interior of a bulb, also including the auxiliary filaments, were gradually decreased and therefore destroyed.

SUMMARY OF THE INVENTION

The primary object of the present invention is to render such halogen electric bulbs usable as two filament lamps for traffic signal light generators.

According to the invention, the foregoing object is achieved in that such a two filament lamp is provided, whereby two filaments can be activated for the operation as "main" filaments periodically and alternately by means of a timer.

It is furthermore advantageous if supervisory means are provided to check the operation of both filaments and to initiate the necessary indication such as "alarm" and "yellow blinking" upon failure of one filament and to cause further operation with only the operable filament.

It is also advantageous to employ a timer for the operation of such two filament lamps for the periodic and alternate switching on of the filaments.

A further embodiment of the invention provides that a day/night switching arrangement, preferably one for the brightness adaptation of the light bulbs to the surroundings, be employed along with the periodic alternate activation of the two filaments of the halogen electric bulb.

BRIEF DESCRIPTION OF THE DRAWING

Other objects, features and advantages of the invention, its organization, construction and operation will be best understood from the following detailed description taken in conjunction with the accompanying drawing wherein in a single FIGURE which is a schematic circuit diagram of a traffic light arrangement constructed in accordance with the present invention.

DESCRIPTION OF THE PREFERRED EMBODIMENT

Referring to FIG. 1, a halogen electric bulb 1 is illustrated as having two filaments 2 and 3. The electric bulb 1 is installed in the "red" illumination field for the stop signal of a traffic signal generator 4 illustrated at the right hand side of the drawing. The red illumination field, that is the halogen electric bulb 1, is switched on and off by way of a signal generator in the form of cam operated contacts $\mathbf{5_1}$ by a program transmitter which is designed as a cam-type program cylinder 5. The program cylinder 5 is operated by a synchronous motor 6. Naturally, instead of the program cylinder 5, with todays technology the traffic light may be controlled by means of computer control semiconductors which would serve as the program transmitter.

A supervisory relay 7 is connected into the current path of the halogen bulb 1 to check its regular illumination. If the stop signal "red" does not work in spite of a corresponding switching order by the signal switch $\mathbf{5_1}$, for example due to a breaking of the filament, the contact $\mathbf{7_1}$ of the supervisory relay 7 will release (close). By means of an alarm 8, an alarm is therefore energized; other signals could also possibly be activated by the contact $7_1$, as is well known in the art. In the case of a deactivated halogen electric bulb 1, the alarm 8 is switched off by means of the working contact $5_3$.

A second supervisory relay 9 in the switchable current path of the filaments 2 and 3 of the halogen bulb 1 respectively provides in case of failure of a just activated filament an immediate transfer to the other filament by way of its contacts $\mathbf{9_1}$ and $9_2$.

More specifically, if the filament 2 is activated, as can be seen from the position of a switching contact $\mathbf{10_1}$ in the drawing, a release of the contact $\mathbf{9_1}$ which is open during the operation of the electric bulb 1 causes the filament 3 to be activated. Furthermore, the supervisory relay 9 interrupts, by way of its initially closed contacts $\mathbf{9_2}$, the voltage supply for the bistable relay 10. As long as the working contact $\mathbf{9_2}$ is closed, the bistable relay 10 is controlled periodically, for example at an interval of one second, by means of a timer switch $5_2$ which can be operated by the program cylinder 5 by way of the capacitors 11 and 12 which serve as pulse formers. Of course, other intervals may be chosen as desired. The switching contacts $10_1$ and $10_2$ of the bistable relay 10 periodically alternately switch to connect the filaments 2 and 3, respectively, during the closed interval of the switch $5_1$. Of course, the switching does not have to take place during the illumination portion of a program, but may be effected during the intervals when the lamps are not energized. However, the timer switch $5_2$ must be designed in such a way that the switching duration of the two filaments 2 and 3 over a longer period of time is approximately equal.

Of course, other arrangements which are already used for control purposes or for brightness control of the signal arrangement can be employed for the switch $5_2$ and the supervisory arrangements of the relays 7 and 9. If in a halogen electric bulb more than two filaments should be required, these filaments can also be switched on and operated in a sequential manner with the same effect and success.

The switching elements which are illustrated in the exemplary embodiment of the invention should only be considered as nonlimiting examples. All components presently known to those skilled in the art, such as transistors, semiconductors and flip-flop circuits, etc may be employed for this purpose.

For a more simple illustration in the sample embodiment, the halogen electric bulb 1 and the respective supervisory and control elements are operated with direct current by way of the diode rectifier bridge 12. Of course, the bulb 1 may also be operated with alternating current; however, for this purpose suitable supervisory and control means responsive to alternating current would be necessary.

Although I have described my invention by reference to an exemplary embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A traffic control arrangement for a traffic light, comprising: a halogen electric lamp, said halogen electric lamp including two filaments which are subject to the tungsten-halogen cyclic process; and control means connected to each of said filaments and operable to periodically and alternately energize said filaments for approximately equal periods of time which are within the interval within which the tungsten halogen process does not become effective, said control means including detecting means connected to said filaments to detect filament failure and means connected to said detecting means and to said filaments for operating the lamp on one filament in response to detection of failure of the other filament.

2. The traffic control arrangement according to claim 1, wherein said control means comprises alarm means connected to said filaments; and supervisory means connected to said filaments and to said alarm means for checking the operational conditions of said filaments and effecting operation of said alarm means in response to failure of a filament.

3. The traffic control arrangement according to claim 1, wherein said means for controlling the periodic and alternate energization of said filaments includes a timer having contacts connected to respective ones of said filaments.

* * * * *